(12) United States Patent
Burrow et al.

(10) Patent No.: US 7,878,439 B2
(45) Date of Patent: Feb. 1, 2011

(54) RETRACTOR WITH PRETENSIONER FOR AUXILIARY LOAD LIMITATION

(75) Inventors: Jon E. Burrow, Ortonville, MI (US); Chad E. Moore, Rochester Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/246,920

(22) Filed: Oct. 7, 2008

(65) Prior Publication Data

US 2010/0084906 A1 Apr. 8, 2010

(51) Int. Cl.
    *B65H 75/48* (2006.01)
(52) U.S. Cl. .................. 242/374; 242/379.1; 242/390.5
(58) Field of Classification Search ................. 242/374, 242/379.1, 375.2; 280/806; 297/476; 60/632, 60/635
    See application file for complete search history.

(56) References Cited

U.S. PATENT DOCUMENTS

| | | | |
|---|---|---|---|
| 5,881,962 A * | 3/1999 | Schmidt et al. ............. 242/374 |
| 6,012,667 A * | 1/2000 | Clancy et al. ............ 242/379.1 |
| 6,363,722 B1 | 4/2002 | Takehara et al. | |
| 6,419,176 B1 * | 7/2002 | Mizuno ....................... 242/374 |
| 6,532,739 B2 * | 3/2003 | Kameyoshi et al. ........... 60/638 |
| 6,722,600 B2 * | 4/2004 | Hamaue et al. ............. 242/374 |
| 7,124,974 B2 | 10/2006 | Shiotani et al. | |
| 7,318,607 B2 * | 1/2008 | Clute ......................... 280/806 |
| 7,380,741 B2 * | 6/2008 | Specht ....................... 242/374 |
| 7,429,012 B2 | 9/2008 | Löffler et al. | |
| 2002/0060261 A1 | 5/2002 | Kameyoshi et al. | |

FOREIGN PATENT DOCUMENTS

WO  WO 2009/045132  4/2009

* cited by examiner

*Primary Examiner*—Michael R Mansen
*Assistant Examiner*—Juan J Campos
(74) *Attorney, Agent, or Firm*—Sally J Brown; Brinks, Hofer, Gilson & Lione

(57) ABSTRACT

An assembly having a retractor and a pretensioner whereby the pretensioner can be employed to provide load limitation features. The pretensioner may also be used without the load limitation features. The pretensioner has a drive mechanism including a plurality of pretensioner balls sized to engage a pinion, the pinion operatively connected to the seat belt through a force limiting element. The pretensioner defines a guide surface structured to guide the pretensioner balls along a ball path along the pinion. The guide surface includes features to engage a pretensioner ball and block the pinion.

25 Claims, 4 Drawing Sheets

RETRACTOR WITH PRETENSIONER FOR AUXILIARY LOAD LIMITATION

FIELD OF THE INVENTION

The present invention relates generally to seat belt restraint apparatus for restraining an occupant of an automobile, and more particularly relates to a retractor having a pretensioner that affects the load limitation characteristics of the restraint system.

BACKGROUND OF THE INVENTION

Seat belt restraint systems for automobiles often include a pretensioner which is structured to apply tension to the seat belt when an impact event such as an accident situation is detected. When the pretensioner is activated, the pretensioner eliminates any slack in the seat belt, and thus controls the physical space between the occupant and the seat belt. In this manner, the occupant of the seat is coupled with the seat belt as the occupant initially moves forward relative to the seat, thereby controllably restraining the occupant, reducing occupant excursion, and preventing undue loads when the occupant moves forwardly into the seat belt.

A retractor is another standard component of a seat belt restraint system which includes a spool receiving the webbing material of the seat belt. The spool is used to wind up and store the webbing. Generally, the spool is locked in place upon detection at an impact situation in order to restrain the occupant via the seat belt. Recently, retractors have been designed having one or more force limiting elements which are structured to allow the spool to rotate and pay out the webbing material of the seat belt upon reaching predetermined force levels between the occupant and seat belt. In this manner, the restraint force imposed on the occupant can be limited in a controlled manner, thereby providing certain load limitation characteristics.

BRIEF SUMMARY OF THE INVENTION

The present invention provides a retractor and a pretensioner that together can form an assembly for a seat belt restraining system for restraining an occupant of a vehicle. In one embodiment of the assembly, the retractor includes a spool receiving a portion of the seat belt and a locking mechanism operatively connected to the spool. The pretensioner has a drive mechanism including a plurality of pretensioner balls sized to engage a pinion. The pinion is operatively connected to the spool through a force limiting element. The pretensioner defines a guide surface structured to guide the pretensioner balls along a ball path around the pinion. The guide surface includes a notch sized to engage a pretensioner ball. The pretensioner is operable in two modes including a first mode and a second mode. In the first mode the drive mechanism of the pretensioner is activated to force the pretensioner balls around the pinion to wind-up seat belt onto the spool. In the second mode the spool is rotated to pay-out seat belt from the spool and a pretensioner ball engages the notch in the guide surface to block rotation of the pinion and limit force through the force limiting element. Preferably the notch is structured as a one-way stop. The pretensioner balls follow the ball path when moving in the wind-up direction, however at least one of the pretensioner balls is blocked in the payout direction by the notch.

According to another embodiment of the invention, a pretensioner includes a gas generator and a pinion. A plurality of pretensioner balls are structured to be driven by the gas generator along the pinion and move the pinion in a first direction. A guide surface is structured to guide the pretensioner balls along a ball path engaging the pinion. The guide surface includes a notch sized to engage a pretensioner ball when the pretensioner balls and pinion are moved in a second direction opposite the first direction.

According to more detailed aspects, the notch in the guide surface is defined by a leading surface and a trailing surface. The leading surface is structured to retain a pretensioner ball within the notch when the pinion and pretensioner balls are moved in the second direction. The trailing surface is structured to permit movement of the pretensioner balls away from the ball path when the pinion and pretensioner balls are moved in the second direction. The trailing surface is structured to force movement of the pretensioner balls towards the ball path when the pretensioner balls are moved in the first direction. The leading surface of the notch is angled relative to the adjacent guide surface to define a shoulder between the leading surface and the adjacent guide surface, the shoulder structured to prevent movement of a pretensioner ball in the second direction. Generally, the notch is structured as a one-way stop.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
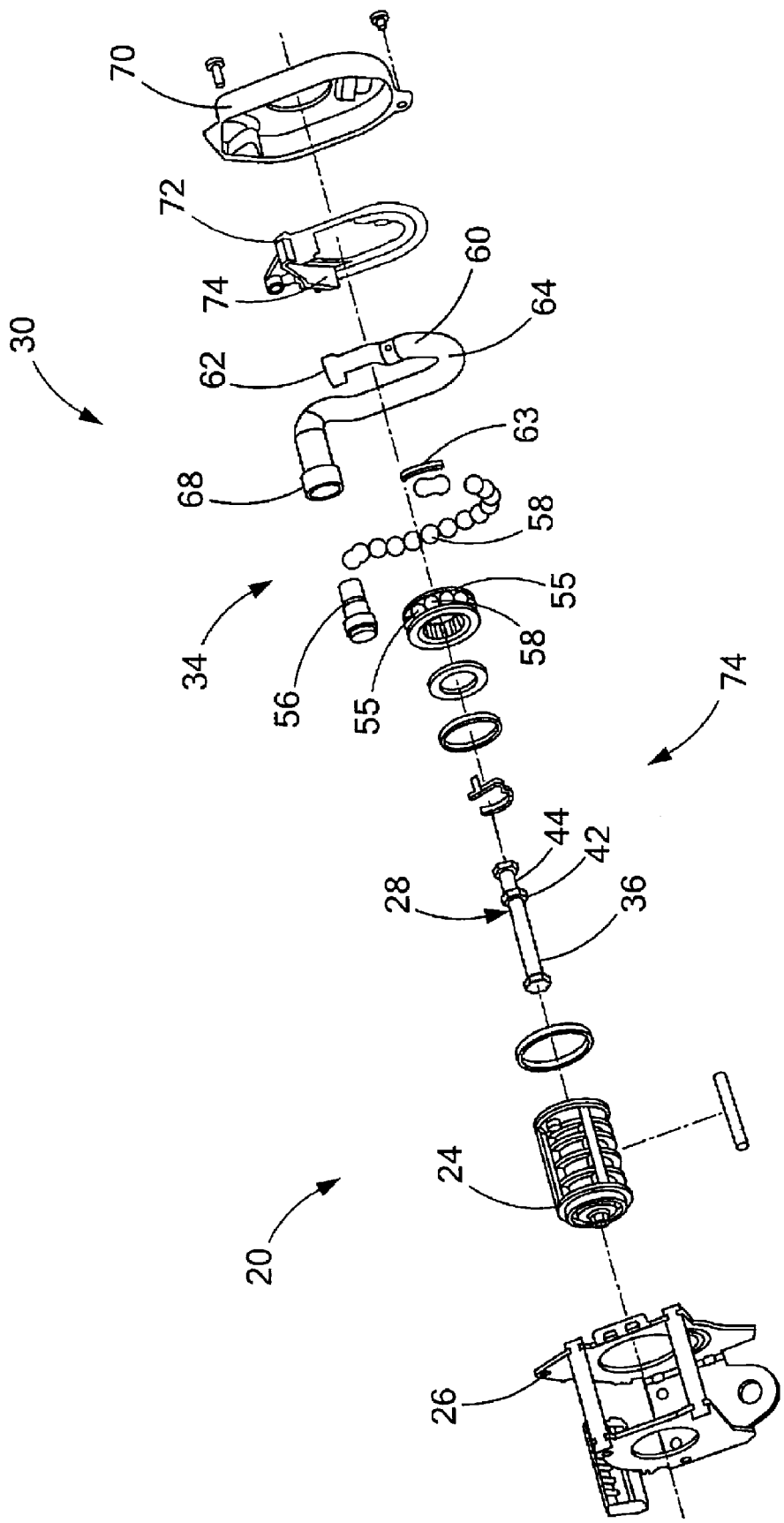
FIG. 1 is an exploded view of a retractor and pretensioner constructed in accordance with the teachings of the present invention.
Figure 2:
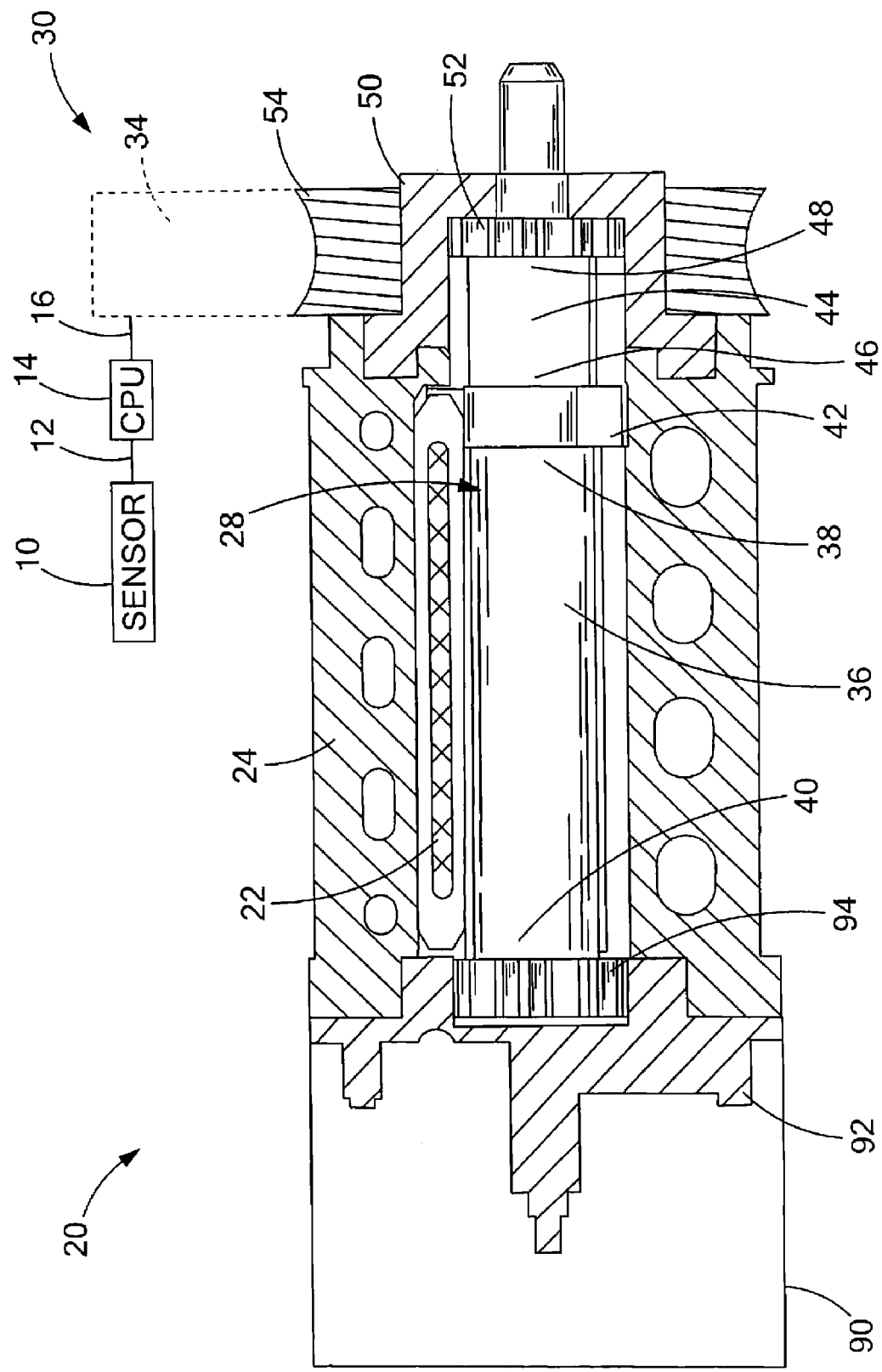
FIG. 2 is a cross-sectional view of the retractor depicted in FIG. 1.

Turning now to the figures, FIG. 1 depicts an exploded view of a seat belt retractor 20 and a pretensioner 30, which together can form an assembly constructed in accordance with the teachings of the present invention. FIG. 2 depicts a cross-sectional view of the retractor 20 and portions of the pretensioner 30. The retractor 20 and pretensioner 30 are adapted for an automobile having a seat belt 22 (FIG. 2) restraining an occupant (not shown). As is known in the art, during normal use the retractor 20 is used to wind up the seat belt 22 about a spool 24. A retractor frame 26 locates and supports the spool 24 with bearing surfaces so that the spool 24 may rotate within the retractor frame 26. In one example, the spool 24 rotates about an axis in a first direction for retraction and/or tightening of the seatbelt 22 and alternatively, rotates in a second direction (e.g. opposed direction) for protraction of the seatbelt 22.

The spool 24 is coupled to a force limiting element 28, which is shown in FIGS. 1 and 2 as a torsion bar 28. Preferably the torsion bar 28 is a multi-segment torsion bar, although it will be recognized by those skilled in the art that other types of force limiting elements other than torsion bars or rods may be employed in conjunction with the present invention, including sleeves, rings or tubes. As will be described in more detail below, the retractor 20 includes a locking mechanism 90 for blocking the torsion bar 28, and hence the spool 24, to controllably restrain the occupant via the seat belt 22. The pretensioner 30 is also operably connected to the torsion bar 28 to rotate the spool 24 to wind-up the seat belt 22. The pretensioner 30 is designed to be locked, and thus may also block rotation of the torsion bar 28 and hence the spool 24. Accordingly, the pretensioner 30 can contribute to providing a secondary or auxiliary load limitation feature, which may exist separately from or be combined with a primary load limitation feature provided by the retractor 20, as will be discussed in more detail herein.

As shown in FIGS. 1 and 2, the pretensioner 30 includes a drive mechanism 34 that is actuated to effectuate rotation of the spool 24 via the torsion bar 28. As best seen in FIG. 2, the torsion bar 28 includes a first force limiting element 36 having a first end 38 and a second end 40. The first end 38 is connected to the spool 24 via a coupling 42. The torsion bar 28 also includes a second force limiting element 44. A first end 46 of the second force limiting element 44 is connected to the spool 24 via the shared coupling 42, although it will be recognized that the first end 46 may be directly attached to the spool 24 or include its own coupling. The second end 48 of the second force limiting element 44 is connected to an end cap 50 via a coupling 52. The end cap 50 is connect to and driven by a pinion 54. A clutch may be used to selectively engage/disengage the pinion 54 with the spool 24 via the end cap 50.

It will be recognized by those skilled in the art that other suitable configurations for operatively connecting the pretensioner 30 to the spool 24 may be used, and the pretensioner 30 may be incorporated into many different retractors. Several exemplary retractors having pretensioners are disclosed in U.S. patent application Ser. No. cases 10/516,033; 10/968, 504; and 11/222,411, and are hereby incorporated by reference in their entirety.

Figure 3:
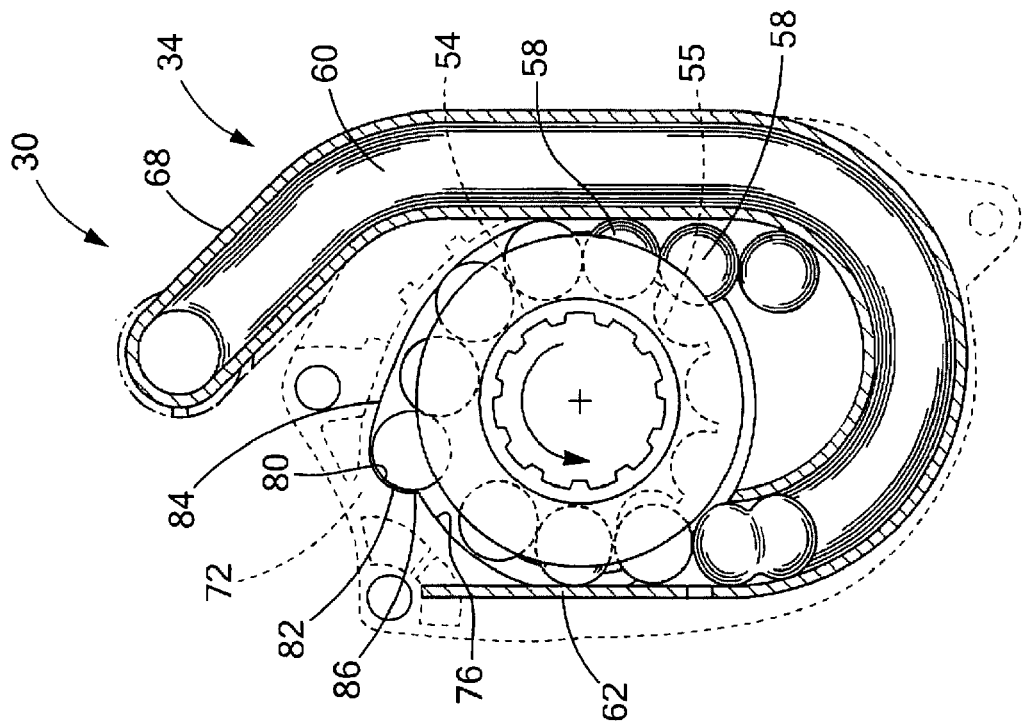
FIG. 3 is a cross-sectional view of the pretensioner depicted in FIG. 1.

As best seen in FIG. 1, the pretensioner 30 is preferably a roto-pretensioner and the drive mechanism 34 includes a gas generator 56 and a plurality pretensioner balls 58 contained within a tube 60 and disposed about the pinion 54. The tube 60 has an open end 62 and may be in the form of a roto tube which includes at least one looped configuration 64. The tube 60 provides a pathway 66 (FIG. 3) for advancing the balls 58 therethrough. A breakaway tab 63 (FIG. 1) may be operatively coupled with the lead pretensioner balls 58 to facilitate the pretensioner balls 58 being retained within the tube 60.

The gas generator 56 (e.g. pyrotechnic charge) is in fluid communication with the tube 60. In one example, the gas generator 56 is positioned at an end 68 of the tube 60 disposed opposite the open end 62. The gas generator 56 is configured to generate gas to advance the pretensioner balls 58 through the opened end 62. If the breakaway tab 63 is used, it is thereby released or "broken" during the gas generation phase, thereby releasing the pretensioner balls 58 from the tube 60.

The open end 62 of the tube 60 is in communication with the pinion 54. For example, the tube 60 is preferably positioned with the open end 62 immediately adjacent to the pinion 54 such that recessed features 55 of the pinion 54 disposed thereabout readily receive the advancing pretensioner balls 58. The pinion 54 receives the moving pretensioner balls 58 which have kinetic energy to actuate rotation of the pinion 54, thereby rotating the spool 24 via the second load limiting element 44 of the torsion bar 28. A pretensioner cover 70 is provided for containing and locating many of the components of the pretensioner 30, such as for example, the tube 60, the pinion 54, and a guide plate 72 (discussed further below). In one example, the cover 70 is constructed of deep drawn or stamped steel, although other suitable constructions for the cover 70 may also be used.

The pretensioner 30 includes a guide plate 72 disposed adjacent to the retractor frame 16. The guide plate 72 guides the pretensioner balls 58 from the drive mechanism 34 and tube 60 past the pinion 54. The guide plate 72 may also provide bearing surfaces for the spindle 24 to rotate and can also provide locating surfaces for several components of the pretensioner 30, such as for example, the tube 60 and the pinion 54.

The guide plate 72 includes a deflector 74 formed thereon for routing the pretensioner balls 58 past the pinion 54. Therefore, the guide plate 72, and to some extent the cover 70, serves to further define the pathway 66 of the pretensioner balls 58. In one embodiment, the deflector 74 defines a guide surface 76 facing radially inwardly and directing the balls 58 along the pathway 66 which is curved around the pinion 54. As such, the guide surface 76 follows a curved path generally corresponding to the ball path 66.

Figure 4:
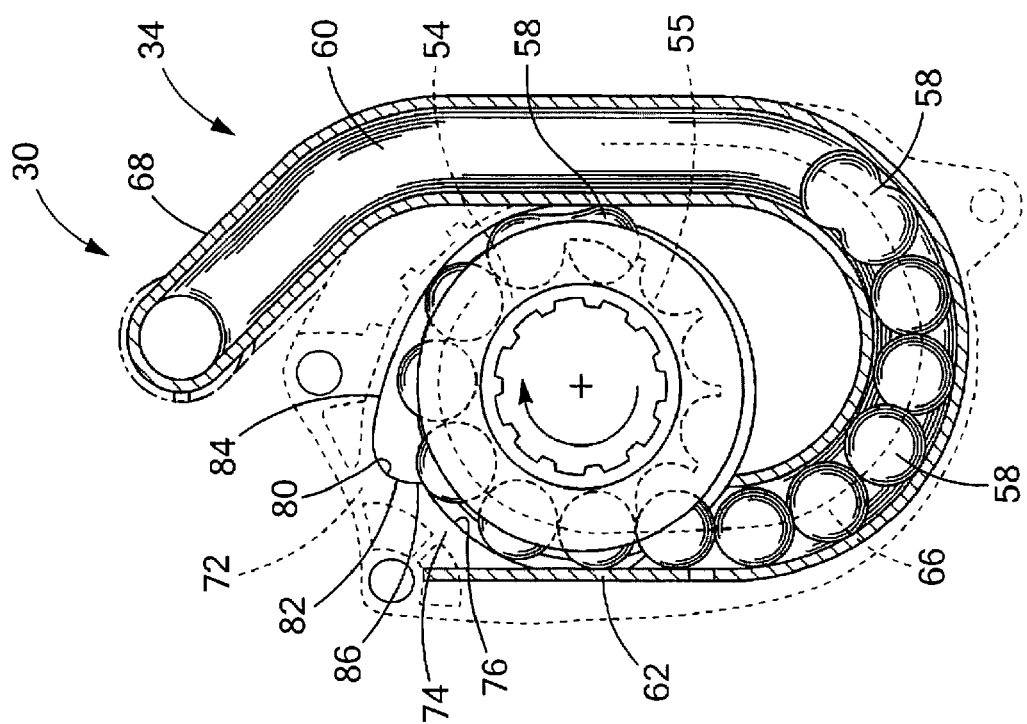
FIG. 4 is another cross-sectional view of the pretensioner depicted in FIG. 1.

The guide surface 76 further includes a contoured notch 80 which serves as a one-way catch or stop. In particular, the notch 80 includes a leading surface 82 and a trailing surface 84 which are structured such that the pretensioner balls 58 follow the path 66 in the wind-up direction, but in the payout direction are blocked by the notch 80 in the guide surface 76. For example, during pretensioning the pinion 54 and balls 58 rotate as indicated by the arrow in FIG. 3, and due to the shape of the leading and trailing surfaces 82, 84, the balls 58 freely follow the path 66 to retract the seatbelt 22 onto the spool 24. Thereafter, when there is increased belt load or load limiting through twisting of the torsion bar 28, the pinion 54 rotates as indicated by the arrow in FIG. 4. In these later situations, the leading and trailing surfaces 82, 84 direct at least one pretensioner ball 58 radially away from the path 66 and into the pocket of the notch 82. The notch 82 and blocked ball 58 are sized and positioned to engage the leading balls and block their rotation in the payout direction, thereby blocking rotation of the pinion 54 and locking the second end 48 of the second load limiting element 44 of the torsion bar 28.

Preferably, the leading surface 82 of the notch 80 is angled relative to the adjacent guide surface 76 (and to the path 66) to define a shoulder 86. The leading surface 82 is transverse to the path 66 and the shoulder 86 may define a sharp corner with the guide surface 76 (although it could be radiused). Preferably the leading surface 82 is angled less than 145° from the guide surface 76 (i.e. at the point where the surfaces meet), and most preferably around 90° (±10°). The trailing surface 84 of the notch 80 slopes gently from its adjacent guide surface 76 and does not define a shoulder or corner. Stated another way, the trailing surface 84 is preferably angled relative to the ball path 66 less than about 60°. The trailing surface 84 is structured so that, even if the balls 58 move radially outwardly (e.g. under centripetal force) as they rotate in the wind-up direction (FIG. 3), they are not blocked by the notch 80 and the trailing surface 84 smoothly guides the balls 58 back towards the path 66. In the pay-out direction (FIG. 4), the leading surface 82 does not guide the balls 58 back towards the path 66, but rather blocks their further movement (i.e. until the pinion 54 is again moved in the wind-up direction).

The guide plate 72 may be made from a metal or plastic/polymer material or materials. Moreover, the guide plate 72 may for example, be die cast, forged (e.g. forged steel) or molded, and as such the notch 80 can be integrally formed without a separate step of machining. In one example, the guide plate 72 is molded from a polymer that has be reinforced with at least one of fiberglass, whiskers, carbon fibers, ceramic fibers, ceramic fillers, polymer fibers and polymer fillers. Other suitable reinforcing additives for polymers known to those skilled in the art may also be used. It will also be recognized that other structures of the retractor 20 or pretensioner 30 may define the guide surface 76 and/or notch 80, including the pretensioner cover 70 or the retractor frame 26.

The pretensioner balls 58 are preferably spheres (e.g. individual spheres or two or more merged spheres), and the notch 80 is contoured accordingly. The balls 58 may be made of a polymer material, such as for example, polyester and/or rubber, although other suitable materials including metals or ceramics may be used. The pretensioner balls 58 preferably operatively seal the tube 60 such that pressure from the gas is maintained within the tube 60 while at least one pretensioner ball 58 is still disposed within the tube 60. Retaining a high seal pressure within the tube 60 will assist in locking the pretensioner 30 to provide the secondary load limitation characteristic. However, it is also recognized that in some retractor designs, in may be desirable to have the pretensioner vented such that the pressure is not maintained on the balls 58.

Figure 5:
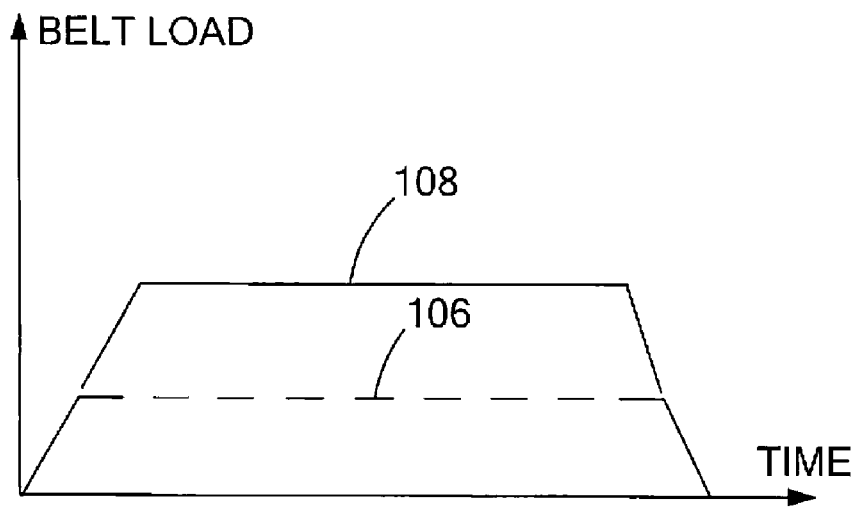
FIG. 5 is a graph depicting the belt load over time in the retractor of FIG. 1.
Figure 6:
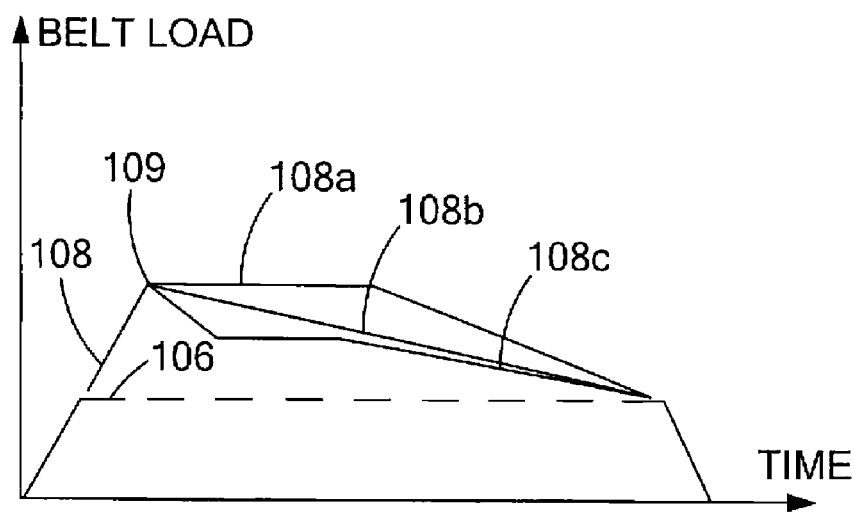
FIG. 6 is another graph depicting the belt load over time in the retractor of FIG. 1.

Turning back to FIG. 2 and to FIGS. 5-7, operation of the retractor 20 and pretensioner 30 will be described. While a particular retractor 20 (and its torsion bar 28) are described herein, it is again reiterated that the pretensioner 30 may also be employed in other retractor designs having different functionality and/or different load limiting elements, or it may be employed in other pretensioning devices where there is no spool (i.e. a buckle pretensioner), and thus the pretensioner 30 can be used to provide a wide variety of load limitation features and characteristics. As is known in the art, the vehicle includes a vehicle sensor 10 sending a signal 12 indicative of an emergency event such as an impact event, crash, emergency braking or the like. The vehicle sensor may be a specific impact sensor, or may be a traditional vehicle sensor (e.g. a longitudinal or lateral acceleration sensor) or otherwise part of a control system having multiple sensors. Typically, an electronic control unit 14 such as a central processing unit (CPU) or other controller receives the signal 12 and controls the vehicle's response to the same, including by sending a pretensioner signal 16 to activate the pretensioner 30.

During normal use the retractor 20 is used to wind up the seat belt 22 about the spool 24, and in an emergency event the retractor locks the spool 24 and seat belt 22 to controllably restrain the occupant. The retractor 20 includes an end assembly 90 that has a locking mechanism to selectively engage a profiled head 92 and lock the second end 40 of the first load limiting element 36 during an impact event such as a vehicle collision, providing an "emergency locking retractor" function as is well known in the art. For example, end assembly 90 may be of the type disclosed in U.S. Pat. Nos. 6,105,894, 6,592,064 and 6,616,081, the disclosures of which are hereby incorporated by reference in their entirety. Through blocking of the profiled head 92, the spool 24 is prevented from rotating and the occupant is restrained by the seat belt 22.

At the same time, the retractor 20 and first force limiting element 36 also provide a low load limitation function in order to limit the restraint force imposed on the occupant. Upon reaching a predetermined restraint force, the spool 24 will begin to rotate and "pay out" the seat belt 22 by actuation of the first force limiting element 36. That is, upon reaching a predetermined force, the torsion rod 36 will twist to allow some rotation of the spool 24 (as well as coupling 42 and first end 38) relative to the profiled head 92 (and hence relative to coupling 46 and second end 40) which is fixed by the locking mechanism of end assembly 90. In this manner, a first load limitation characteristic is provided by the torsion of the first force limiting element 36 to allow limited pay out of the seat belt 22 wound on the spool 24.

Also shown in FIG. 2, the pretensioner 30 is provided for pretensioning the seat belt 22 in conjunction with the retractor 20. The pretensioner 30 is activated by the electronic control unit 14 via a pretension signal 16. In particular, the drive mechanism 34 is actuated to effectuate rotation of the spool 24 via the second force limiting element 44, as previously described.

It will be recognized by those skilled in the art that while the first ends 38, 46 of the first and second force limiting elements 36, 44 are located adjacent each other and are rigidly connected to the spool 34, the second force limiting element 44 and the pretensioner 30 could be connected to the second end 40 of the first force loading element 36, and more specifically connected to the profiled head 92. It will also be recognized that the first and second load limiting elements 36, 44 may be formed out of a single torsion bar wherein the opposing free ends of the bar would be selectively blocked (either via the locking mechanism or the pretensioner drive 34) to cause load limitation through the force limiting elements 36, 44. Further, the second force limiting element 44 could be a hollow tube which slides around a reduced diameter end of the torsion rod 36 forming the first force limiting element 36.

The retractor 20 is operable in at least two modes upon detection of an emergency event. In a first load limiting mode, the tread head 92 is blocked by the locking element of end assembly 90. Accordingly, rotation of the spool 24 is blocked through the first load limiting element 36 and Profiled head 92, providing a first load limitation characteristic described further below. In a second load limiting mode, the pretensioner 30, and particularly its drive mechanism 34, is activated in addition to the blocking of the tread head 92. When the pretensioner 30 and its balls 58 become blocked as described above, rotation of the spool 24 in the second mode is blocked through both the first and second load limiting elements 36, 44, providing a second load limitation characteristic also described further below.

The second load limiting mode includes a pretensioning phase and a load limiting phase. In the pretensioning phase, the slack between the seat belt 22 and the occupant is removed. In the load limiting phase, a limited amount of seat belt 22 is paid out in order to control the level of belt force imposed on the occupant during the crash event. Upon determination of an impending emergency event, either via the crash sensor 10 or a separate sensor incorporated into the pretensioner 30, the drive mechanism 34 drives the pinion 54 and end cap 50 to rotate the second force limiting element 44, which in turn rotates the spool 24 in a direction to wind up the seat belt 22 and remove any slack between the occupant and the seat belt 22. The second force limiting element 44 is preferably designed as a torsion rod, and preferably is capable of transmitting the pretensioning force from the drive mechanism 34 without significant deformation, although this is not required and the second torsion rod 44 may be partially deformed (i.e. loaded) during pretensioning.

In the load limiting phase of the second mode, after activation of the pretensioner 30 and in addition to blocking the tread head 92 to employ the first force limiting element 36, the end cap 50 is held in place such that any rotation of the spool 24 to pay out seat belt 22 will require deformation of the second load limiting element 44 (i.e. rotation of the coupling 42 and first end 46 relative to the coupling 52 and second end 48). When both the profiled head 92 and the end cap 50 are held in place, a second load limitation characteristic is provided through the combination of first force limiting element 36 and second force limiting element 44, which in this embodiment are superimposed.

The load limitation characteristics provided by the retractor 20 and pretensioner 30 will now be described with reference to the graphs depicted in FIGS. 5, 6 and 7 which present idealized data. In the figures, the Y-axis represents belt load while the X-axis represents time, and in FIG. 5 the dotted line 106 represents the low constant load limitation characteristic (preferably in the range of 2 kN to 3 kN) obtained when the pretensioner 30 is not activated, and hence the second force limiting element 44 is not effective, since both its ends 46, 48 are free to rotate. When the pretensioner 30 is activated, both the first and second force limiting elements 36, 44 are employed (since the pretensioner 30 blocks end 48 of the second force limiting element 44) to control the pay out of seat belt 22 by rotation of the spool 24, and thus a second load limitation characteristic is provided and is indicated by line 108 in the graph of FIG. 5. Thus, the second load limitation characteristic shows a high constant load limitation which is preferably in the range of 5 kN to 6 kN.

It will be recognized by those skilled in the art that by employing two force limiting elements 36, 44, various other load limit characteristics may be achieved. In FIG. 6, the second load limitation characteristic 108 is provided with degressive load limitation. In particular, after reaching a predetermined belt load at point 109, the second load limitation characteristic 108 begins to decrease in any one of a number of manners, some of which are shown as lines 108a, 108b and 108c. In order to provide this degressive load limitation, the second force limiting element 44 may be provided with various shapes or constructed of various materials which result in degressive load limits over time.

Figure 7:
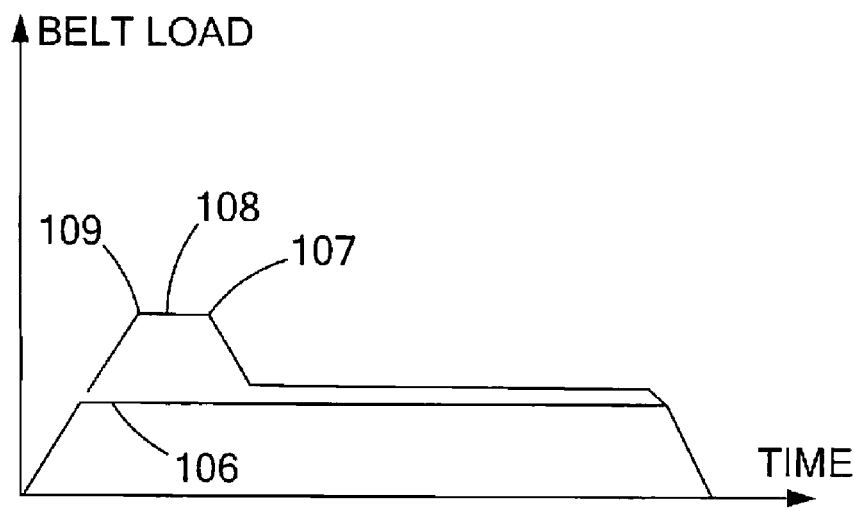
FIG. 7 is yet another graph depicting the belt load over time in the retractor of FIG. 1.

Similarly, and as shown in FIG. 7, the second force limiting element 44 may be superimposed on the first force limiting element 36 until a pre-selected number of spool rotations are reached. Then, the second force limiting element 44 is decoupled from the spool 34, preferably by shearing off the coupling 52 (or even the coupling 42), or alternatively by designed failure of the second force limiting element 44. In this manner, the second load limitation characteristic 108 will follow its standard course to a predetermined belt load 109, which will be maintained for a period of time and/or a number of spool rotations until point 107, at which time the limitation on the belt load will be reduced to a level close to the force level provided by the first load limitation characteristic 106. The difference between the first and second load limitation characteristics 106, 108 beyond point 107 represents the level of friction between the end cap 50 and spool 24, which may be designed to provide a specific amount of load limitation. More specifically, the pretensioner 30 and its balls 58 are still blocked, resulting in relative rotation between the end cap 50 and the spool 24. In this manner, a degressive load limitation may be provided for the second load limitation characteristic 108 via the second force limiting element 44, which is disconnected upon a predetermined number of spool rotations. It will also be recognized that a progressive load limitation could also be provided through design of the force limiting elements.

It will be recognized by those skilled in the art that the retractor and pretensioner of the present invention provide increase adaptability and control over the load limitation characteristics imposed by the devices and the seat belt on an occupant, by providing additional load limitation through a second force limiting element via the pretensioner. The locking of the pretensioner is accomplish through simple design a guide surface, and does not require additional structure or activating mechanisms, and avoids complex manufacture. Further, the retractor and pretensioner reduce or eliminates "locking dip", which as used in the industry describes the phenomena of loss of belt load when the torque load is transferred from the pretensioner to the blocking element that blocks the profiled head to activate the force limiting element. By activating the pretensioner and later blocking the pinion, while the first force limiting element is activated through blocking of the tread head, "locking dip" is substantially eliminated.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An assembly for a seat belt restraining system for restraining an occupant of a vehicle, the assembly comprising:
    a retractor having a spool receiving a portion of the seat belt and a locking mechanism operatively connected to the spool;
    a pretensioner having a drive mechanism including a plurality of pretensioner balls sized to engage a pinion, the pinion operatively connected to the spool through a force limiting element, the pretensioner defining a guide surface structured to guide the pretensioner balls along a ball path around the pinion, the guide surface including a notch sized to engage at least one of the plurality of pretensioner balls, the pretensioner balls engaging the pinion along an engagement section of the guide surface, the notch being located along the engagement section; and
    the pretensioner operable in two modes including,
        a first mode wherein the drive mechanism of the pretensioner is activated to force the pretensioner balls around the pinion to wind-up seat belt onto the spool, and
        a second mode wherein the spool is rotated to pay-out seat belt from the spool and one of the plurality of pretensioner balls engages the notch in the guide surface to block rotation of the pinion and limit force through the force limiting element.

2. The assembly of claim 1, wherein the notch is structured as a one-way stop.

3. The assembly of claim 1, wherein the guide surface follows a curved path generally corresponding to the ball path, and wherein the notch defines a discontinuity in the curved path of the guide surface.

4. The assembly of claim 1, wherein the pretensioner balls follow the ball path when moving in the wind-up direction, and wherein at least one of the pretensioner balls is blocked in the payout direction by the notch.

5. The assembly of claim 1, wherein the notch in the guide surface is defined by a leading surface and a trailing surface.

6. The assembly of claim 5, wherein the leading surface is structured to retain a pretensioner ball within the notch when the pinion and pretensioner balls are rotated in a pay-out direction.

7. The assembly of claim 5, wherein the trailing surface is structured to permit radial movement of the pretensioner balls relative to the ball path when the pinion and pretensioner balls are rotated in a pay-out direction.

8. The assembly of claim 5, wherein the trailing surface is structured to force radial movement of the pretensioner balls towards the ball path when the pretensioner balls are rotated in a wind-up direction.

9. The assembly of claim 5, wherein the leading surface is sharply angled relative to the portion of the guide surface immediately adjacent the leading surface.

10. The assembly of claim 9, wherein the trailing surface is gently angled relative to the portion of the guide surface immediately adjacent the trailing surface.

11. The assembly of claim 1, wherein the locking mechanism is operatively connected to the spool through a first force limiting element, and wherein the force limiting element connected to the pretensioner is a second force limiting element.

12. The assembly of claim 11, wherein the first and second force limiting elements are segments of a multi-segment torsion bar.

13. The assembly of claim 11, wherein the retractor is operable to two modes including,
a first load limiting mode wherein the locking mechanism is activated to limit belt force through the first force limiting element, and
a second load limiting mode, wherein the drive mechanism of the pretensioner is activated to retract seat belt onto the spool and thereafter the pinion is blocked to limit force through the second force limiting element, and wherein the locking mechanism is activated to limit belt force through the first force limiting element.

14. The assembly of claim 1, wherein the notch is spaced upstream from a downstream end of the ball path.

15. The assembly of claim 1, wherein, in the second mode, the one pretensioner ball engaged with the notch is also engaged with at least one downstream pretensioner ball that is engaged with the pinion of the pretensioner.

16. A pretensioner for a seat belt restraining system for restraining an occupant of a vehicle, the assembly comprising:
a gas generator;
a pinion;
a plurality of pretensioner balls structured to be driven by the gas generator along the pinion and move the pinion in a first direction;
a guide surface structured to guide the pretensioner balls along a ball path engaging the pinion, the guide surface including a notch sized and positioned to engage at least one of the pretensioner balls when the pinion is moved in a second direction opposite the first direction, wherein force is transmitted from the pinion through a portion of the plurality of pretensioner balls to the at least one of the pretensioner balls engaged with the notch to prevent further rotation of the pinion in the second direction.

17. The assembly of claim 16, wherein the notch in the guide surface is defined by a leading surface and a trailing surface.

18. The assembly of claim 17, wherein the leading surface of the notch is angled relative to the adjacent guide surface to define a shoulder between the leading surface and the adjacent guide surface, the shoulder structured to prevent movement of a pretensioner ball in the second direction.

19. The assembly of claim 18, wherein the leading surface is angled less than 145° from the adjacent guide surface and greater than 80° from the adjacent guide surface.

20. The assembly of claim 17, wherein the leading surface is transverse to the ball path.

21. The assembly of claim 17, wherein the trailing surface is sloped away from the ball path.

22. The assembly of claim 17, wherein the leading surface is structured to retain a pretensioner ball within the notch when the pinion and pretensioner balls are moved in the second direction.

23. The assembly of claim 17, wherein the trailing surface is structured to permit movement of the pretensioner balls away from the ball path when the pinion and pretensioner balls are moved in the second direction.

24. The assembly of claim 17, wherein the trailing surface is structured to force movement of the pretensioner balls towards the ball path when the pretensioner balls are moved in the first direction.

25. The assembly of claim 16, wherein the pretensioner balls engage the pinion between an upstream point and a downstream point along the ball path, and wherein the notch is located between the upstream point and the downstream point.

\* \* \* \* \*